US012669708B2

(12) United States Patent
Fu et al.

(10) Patent No.: US 12,669,708 B2
(45) Date of Patent: Jun. 30, 2026

(54) METHOD TO IMPROVE DISPLAY EFFICIENCY AND UNIFORMITY OF AR WAVEGUIDE

(71) Applicant: Applied Materials, Inc., Santa Clara, CA (US)

(72) Inventors: Jinxin Fu, Fremont, CA (US); Ludovic Godet, Sunnyvale, CA (US)

(73) Assignee: Applied Materials, Inc., Santa Clara, CA (US)

( * ) Notice: Subject to any disclaimer, the term of this patent is extended or adjusted under 35 U.S.C. 154(b) by 456 days.

(21) Appl. No.: 18/143,747

(22) Filed: May 5, 2023

(65) Prior Publication Data

US 2023/0384596 A1 Nov. 30, 2023

Related U.S. Application Data

(60) Provisional application No. 63/365,447, filed on May 27, 2022.

(51) Int. Cl.
G02B 27/01 (2006.01)
F21V 8/00 (2006.01)
G02B 1/115 (2015.01)
G02B 6/42 (2006.01)

(52) U.S. Cl.
CPC ....... *G02B 27/0172* (2013.01); *G02B 6/0016* (2013.01); *G02B 6/0038* (2013.01); *G02B 1/115* (2013.01); *G02B 6/4212* (2013.01); *G02B 2027/0112* (2013.01)

(58) Field of Classification Search
CPC ....... G03F 7/0005; G03F 7/16; G02B 5/1857; G02B 6/136; G02B 27/0172; G02B 6/0016; G02B 6/0038; G02B 1/115; G02B 6/4212; G02B 2027/0112
See application file for complete search history.

(56) References Cited

U.S. PATENT DOCUMENTS

| | | | |
|---|---|---|---|
| 2006/0062521 A1 | 3/2006 | Zhou et al. | |
| 2007/0025680 A1* | 2/2007 | Winston | G02B 6/0016 |
| | | | 385/146 |
| 2010/0002950 A1* | 1/2010 | Arieli | G01B 11/24 |
| | | | 702/167 |
| 2013/0022316 A1 | 1/2013 | Pelletier et al. | |

(Continued)

FOREIGN PATENT DOCUMENTS

WO 2022/240550 A1 11/2022

OTHER PUBLICATIONS

International Search Report and Written Opinion for International Application No. PCT/US2023/021105 dated Aug. 28, 2023.

(Continued)

*Primary Examiner* — Uyen Chau N Le
*Assistant Examiner* — Darby M. Thomason
(74) *Attorney, Agent, or Firm* — Patterson + Sheridan, LLP

(57) ABSTRACT

Embodiments of the present disclosure generally relate to methods of modifying and engineering the effective thickness of an optical device substrate. The methods provide for depositing a material that is index-matched to the substrate to alter a thickness distribution of the optical device. By adjusting the thickness distribution, the optical path of light is modulated to direct the light to the output coupling grating.

7 Claims, 7 Drawing Sheets

(56)　　　　　References Cited

U.S. PATENT DOCUMENTS

| | | |
|---|---|---|
| 2014/0241662 A1 | 8/2014 | Park et al. |
| 2015/0118822 A1* | 4/2015 | Zhang ............... H01L 21/76224 |
| | | 438/433 |
| 2015/0241706 A1 | 8/2015 | Schowengerdt |
| 2016/0005662 A1* | 1/2016 | Yieh ..................... H10P 74/203 |
| | | 438/14 |
| 2016/0276150 A1* | 9/2016 | Xue ................... H10P 14/6336 |
| 2017/0144929 A1* | 5/2017 | Olson ................... C03C 23/006 |
| 2018/0081084 A1* | 3/2018 | Zhu ........................... B05D 5/06 |
| 2019/0212588 A1* | 7/2019 | Waldern ........... B29D 11/00682 |
| 2020/0278606 A1 | 9/2020 | Singh et al. |
| 2021/0180183 A1* | 6/2021 | Guo ........................ C23C 16/32 |
| 2021/0255387 A1 | 8/2021 | Bhargava et al. |
| 2022/0035251 A1* | 2/2022 | Guo .......................... G03F 7/16 |
| 2022/0082936 A1 | 3/2022 | Franke et al. |
| 2022/0091428 A1 | 3/2022 | Riley et al. |
| 2022/0342366 A1* | 10/2022 | Moon ................ G02B 27/0172 |
| 2024/0019698 A1* | 1/2024 | Crosby ............... G02B 5/1833 |

OTHER PUBLICATIONS

Extended European Search Report for Application No. 23812326.9 dated May 6, 2026.

* cited by examiner

200

MEASURE SUBSTRATE THICKNESS DISTRIBUTION — 201

DETERMINE DESIGN THICKNESS DISTRIBUTION — 202

DETERMINE ENGINEERED THICKNESS DISTRIBUTION — 203

DISPOSE INDEX-MATCHED LAYER TO FORM DESIGN THICKNESS DISTRIBUTION — 204

DISPOSE ANTI-REFLECTIVE LAYER OVER THE INDEX-MATCHED LAYER — 205

DISPOSE LOW INDEX LAYER — 206

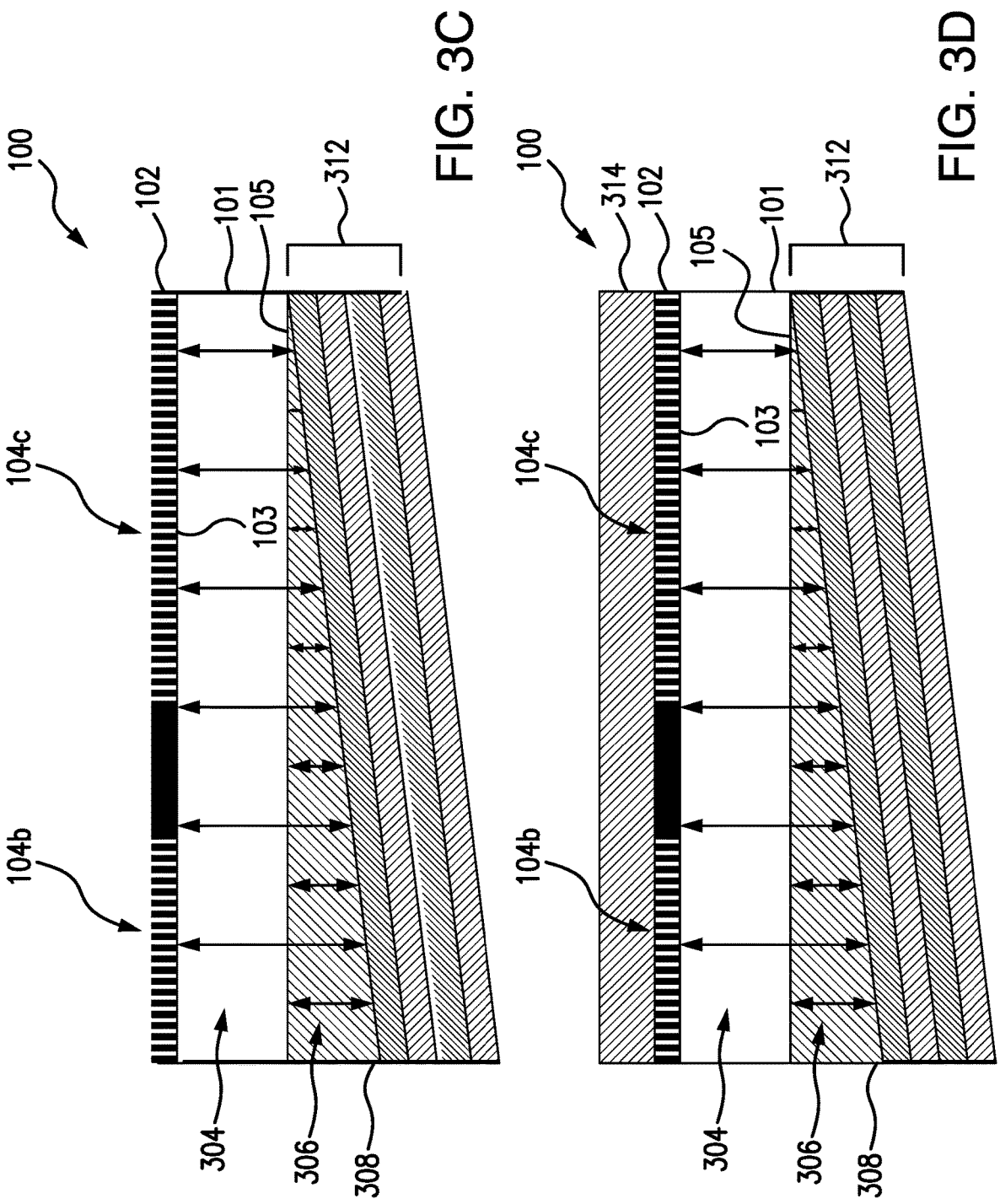

400

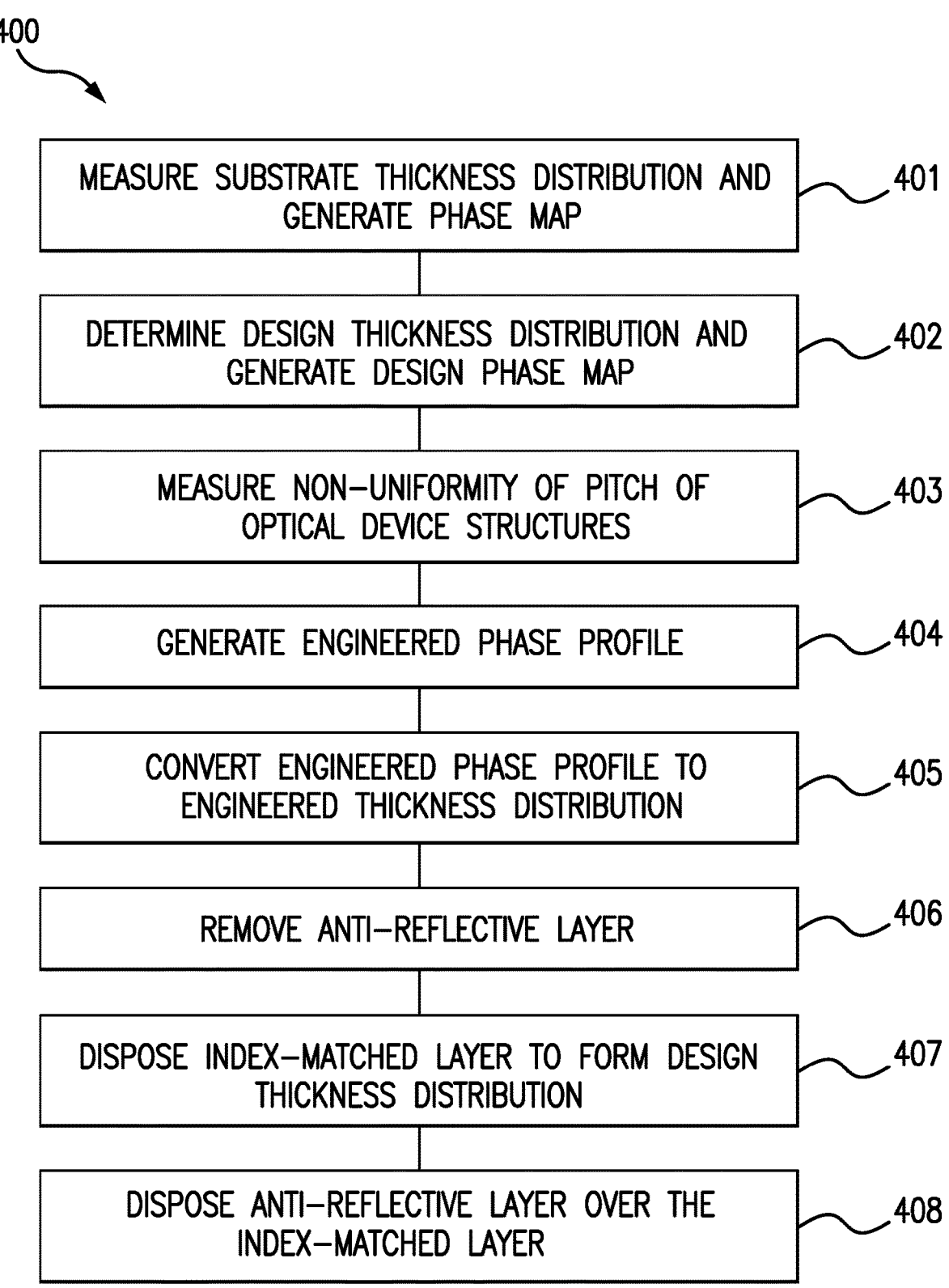

| MEASURE SUBSTRATE THICKNESS DISTRIBUTION AND GENERATE PHASE MAP | 401 |

DETERMINE DESIGN THICKNESS DISTRIBUTION AND GENERATE DESIGN PHASE MAP — 402

MEASURE NON-UNIFORMITY OF PITCH OF OPTICAL DEVICE STRUCTURES — 403

GENERATE ENGINEERED PHASE PROFILE — 404

CONVERT ENGINEERED PHASE PROFILE TO ENGINEERED THICKNESS DISTRIBUTION — 405

REMOVE ANTI-REFLECTIVE LAYER — 406

DISPOSE INDEX-MATCHED LAYER TO FORM DESIGN THICKNESS DISTRIBUTION — 407

DISPOSE ANTI-REFLECTIVE LAYER OVER THE INDEX-MATCHED LAYER — 408

FIG. 4

METHOD TO IMPROVE DISPLAY EFFICIENCY AND UNIFORMITY OF AR WAVEGUIDE

CROSS-REFERENCE TO RELATED APPLICATIONS

This application claims the benefit of U.S. Provisional Patent Application Ser. No. 63/365,447, filed May 27, 2022, which is incorporated by reference herein in its entirety.

BACKGROUND

Field

Embodiments of the present disclosure generally relate to optical devices. More specifically, embodiments described herein provide for methods to modify and engineer the effective thickness of an optical device substrate.

Description of the Related Art

Virtual reality is generally considered to be a computer generated simulated environment in which a user has an apparent physical presence. A virtual reality experience can be generated in 3D and viewed with a head-mounted display (HMD), such as glasses or other wearable display devices that have near-eye display panels as optical devices to display a virtual reality environment that replaces an actual environment.

Augmented reality, however, enables an experience in which a user can still see through the optical devices of the glasses or other HMD device to view the surrounding environment, yet also see images of virtual objects that are generated for display and appear as part of the environment. Augmented reality can include any type of input, such as audio and haptic inputs, as well as virtual images, graphics, and video that enhances or augments the environment that the user experiences. As an emerging technology, there are many challenges and design constraints with augmented reality.

Specifically, maintaining color uniformity and a high coupling efficiency of optical devices can be challenging. Color uniformity and coupling efficiency are related to the optical interference between different light paths within the optical device. Accordingly, what is needed in the art are improved methods of modulating the optical interference to enhance the light coupling efficiency to the outcoupler and optimizing the efficiency across the field of view.

SUMMARY

In one embodiment, an optical device is provided. The optical device includes a substrate having a substrate thickness distribution defined by a top surface of the substrate and a bottom surface of the substrate. The substrate thickness distribution varies along a first length parallel to the top surface and a second length perpendicular to the first length. The optical device further includes an index-matched layer disposed on the bottom surface of the substrate, the index-matched layer having an engineered thickness distribution defined by an exterior surface of the index-matched layer and the bottom surface of the substrate. The engineered thickness distribution varies along the first length and the second length perpendicular to the first length. The optical device further includes a plurality of optical device structures formed on the top surface of the substrate, a low index layer disposed over the plurality of optical device structures and an anti-reflective layer disposed over the exterior surface of the index-matched layer.

In another embodiment, a method of forming a design thickness distribution in an optical device is provided. The method includes measuring a substrate thickness distribution of a substrate defined by a distance between a top surface of the substrate and a bottom surface of the substrate along a first length parallel to the top surface and a second length perpendicular to the first length, disposing an index-matched layer on the bottom surface of the substrate, and etching the index-matched layer to have an engineered thickness distribution to form a design thickness distribution. The design thickness distribution is defined by the engineered thickness distribution and the substrate thickness distribution and the design thickness distribution varies along the first length and the second length.

In yet another embodiment, a method of forming a design thickness distribution in an optical device is provided. The method includes measuring a substrate thickness distribution of a substrate defined by a distance between a top surface of the substrate and a bottom surface of the substrate along a first length parallel to the top surface and a second length perpendicular to the first length, generating a phase map from the substrate thickness distribution across the bottom surface of the substrate, measuring a non-uniformity of pitch between adjacent optical device structures of a plurality of optical device structures disposed on the top surface of the substrate, generating an engineered phase profile by subtracting the phase map and the non-uniformity of pitch from a design phase map corresponding to a phase to be formed at each location of the optical device, and converting the engineered phase profile to an engineered thickness distribution. The method further includes disposing an index-matched layer on the bottom surface of the substrate to have the engineered thickness distribution to form a design thickness distribution. The design thickness distribution is defined by the engineered thickness distribution and the substrate thickness distribution and the design thickness distribution varies along the first length and the second length.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of scope, as the disclosure may admit to other equally effective embodiments.

FIGS. 3A-3D are schematic, side views of an optical device during the method according to embodiments described herein.

FIG. 4 is a flow diagram of a method of modifying the thickness of an optical device according to embodiments described herein.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments of the present disclosure generally relate to optical devices. More specifically, embodiments described herein provide for methods to modify and engineer the effective thickness of an optical device substrate. The methods described herein for modulating optical interference of an optical device improve waveguide efficiency, color uniformity, and eyebox uniformity. The method includes removing or coating an extra dielectric layer on the optical device substrate. The thickness of the dielectric layer varies in the two dimensional plane parallel to the optical device substrate.

Figure 1:
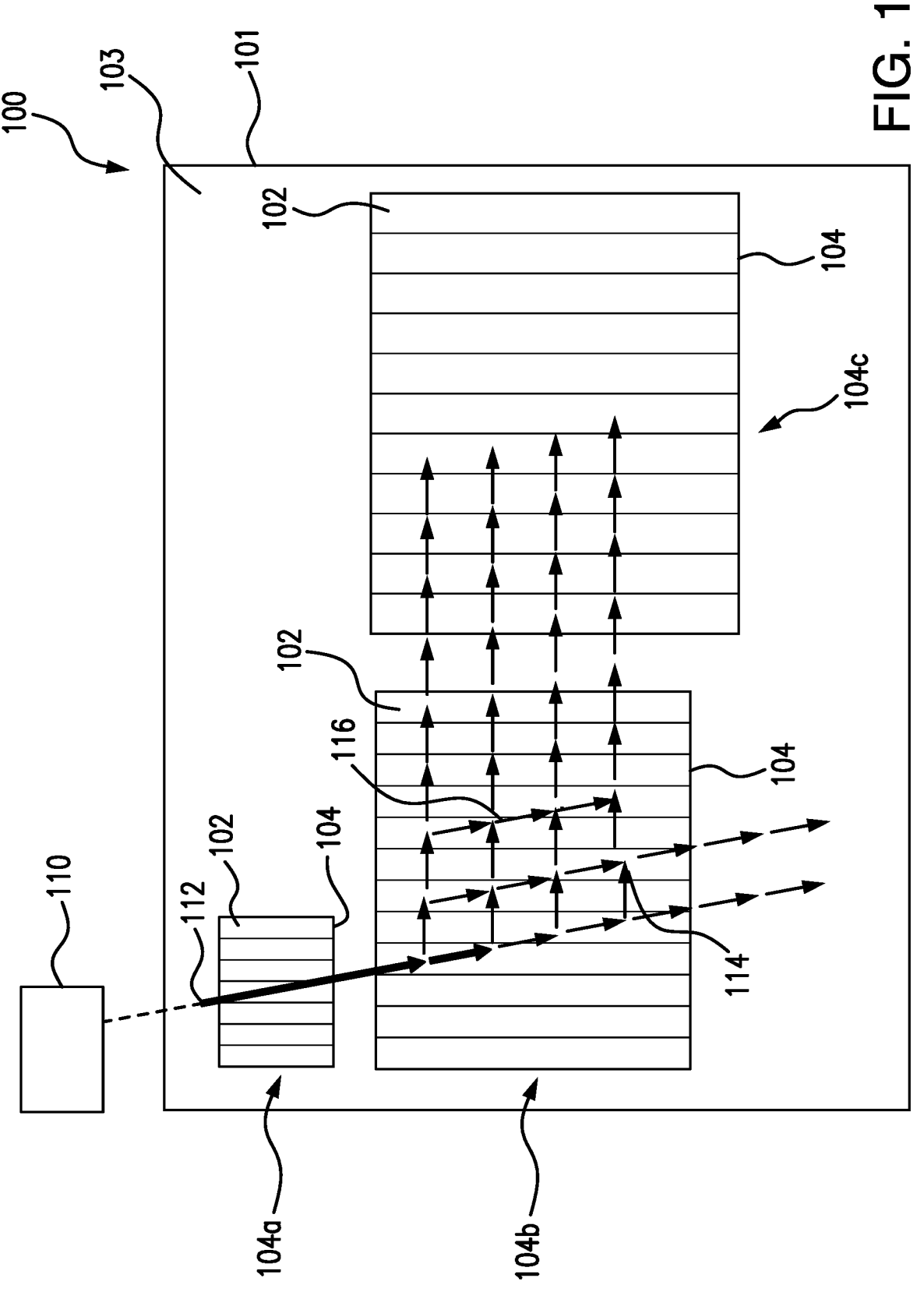
FIG. 1 is a perspective, frontal view of an optical device according to embodiments described herein.

FIG. 1 is a perspective, frontal view of an optical device 100. It is to be understood that the optical device 100 described below is an exemplary optical device. In one embodiment, which can be combined with other embodiments described herein, the optical device 100 is a waveguide combiner, such as an augmented reality waveguide combiner. The optical device 100 includes a plurality of optical device structures 102 disposed on a top surface 103 of a substrate 101. The optical device structures 102 may be nanostructures having sub-micron dimensions, for example, nano-sized dimensions. In one embodiment, which can be combined with other embodiments described herein, regions of the optical device structures 102 correspond to one or more gratings 104, such as a first grating 104a, a second grating 104b, and a third grating 104c. In another embodiment, which can combined with other embodiments described herein, the optical device 100 is a waveguide combiner that includes at least the first grating 104a corresponding to an input coupling grating and the third grating 104c corresponding to an output coupling grating. The waveguide combiner, according to the embodiment, which can be combined with other embodiments described herein, includes the second grating 104b corresponding to an intermediate grating.

While FIG. 1 depicts the optical device structures 102 as having square or rectangular shaped cross-sections, the cross-sections of the optical device structures 102 may have other shapes including, but not limited to, circular, triangular, elliptical, regular polygonal, irregular polygonal, and/or irregular shaped cross-sections. In some embodiments, which can be combined with other embodiments described herein, the cross-sections of the plurality of optical device structures 102 have different shaped cross-sections. In other embodiments, which can be combined with other embodiments described herein, the cross-sections of the optical device structures 102 have cross-sections with substantially the same shape. The plurality of optical device structures 102 may also be angled relative to the top surface 103 of the substrate 101.

A light engine 110 is configured to direct a light beam 112 to the optical device 100. In one example, the light engine 110 includes a microdisplay that provides a pattern to the optical device 100 via the light beam 112. The light beam 112 undergoes total internal reflective through the optical device 100. The optical device 100 directs the light beam 112 out to a human eye of a user of the optical device 100. In order to improve coupling efficiency and color uniformity of the optical device 100, the optical device 100 can be modulated to direct more of the light beam 112 in a first direction 114 compared to a second direction 116. The first direction 114 corresponds to a direction toward the third grating 104c, while the second direction 116 corresponds to away from the third grating 104c. When the local substrate thickness variation is small (e.g., less than 500 nm of variation), the first direction 114 has a high probability to be destructive interference, while the second direction 116 has a high probability to be constructive interference. Constructive interference along the second direction 116 and destructive interference along the first direction 114 will decrease the coupling efficiency of the optical device 100.

Methods 200 and 400 described below include removing or coating an extra dielectric layer on the optical device substrate. The thickness of the dielectric layer varies in the two dimensional plane parallel to the substrate 101. The methods 200 and 400 described herein allow for adjusting the optical path of an optical device 100 after fabrication, improving one or more characteristics of the optical device 100. For example, an optical device 100 that does not meet pre-determined thresholds of optical efficiency can be adjusted retroactively to achieve the threshold using embodiments described herein.

Figure 2:
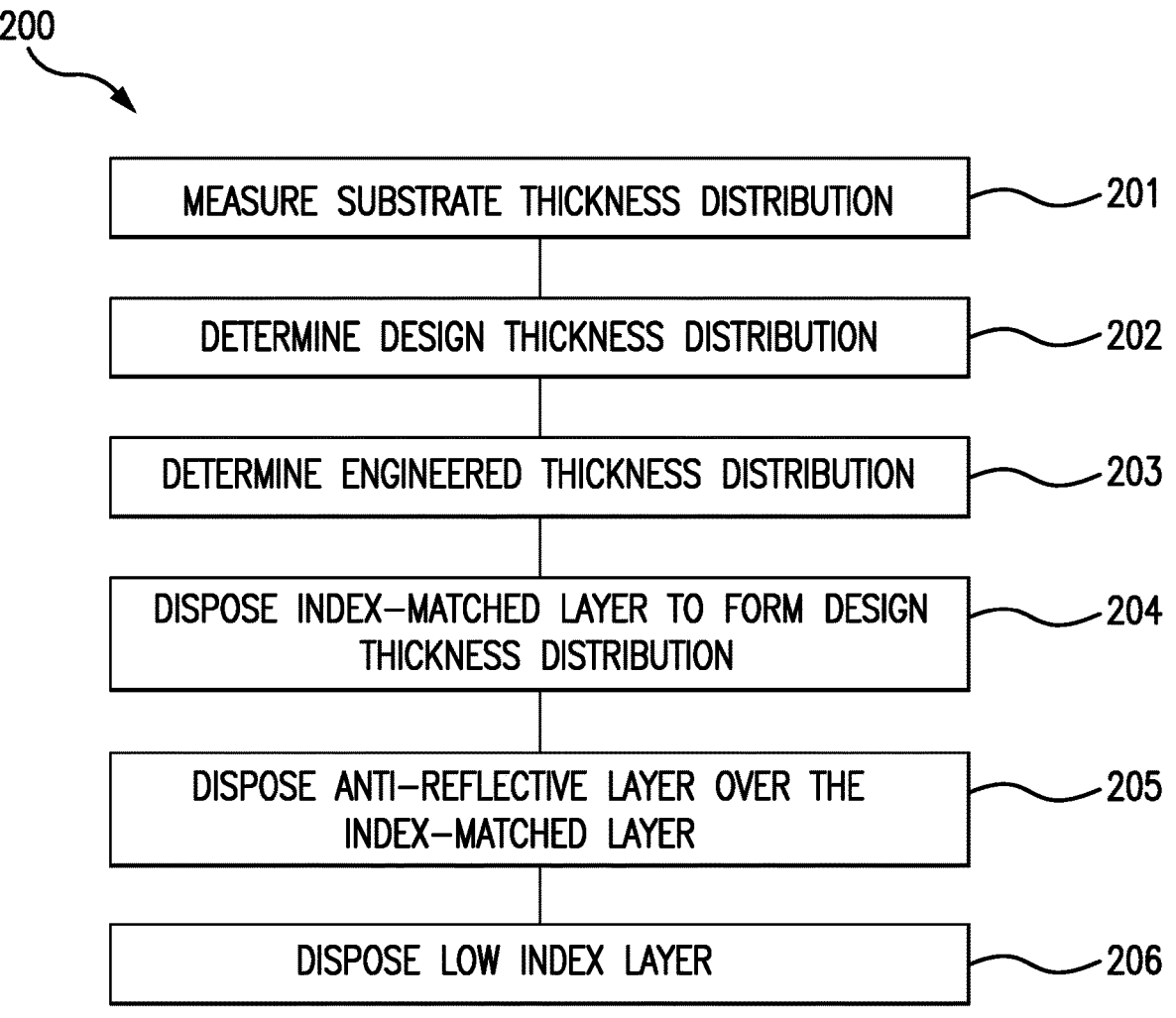
FIG. 2 is a flow diagram of a method of modifying the thickness of an optical device according to embodiments described herein.

FIG. 2 is a flow diagram of a method 200 of modifying the thickness of an optical device 100. FIGS. 3A-3D are schematic, side views of an optical device 100 during the method 200. The method 200 improves the display efficiency and display uniformity of the optical device 100, while not damaging and/or decreasing the display resolution. The method 200 also will save optical devices 100 with low efficiency or display uniformity below a pre-determined threshold. The optical device 100 is already formed but may have a lower efficiency due to thickness of the optical device or pitch uniformity of the optical device structures. Adjusting the thickness variation will allow light to go in the correct optical path towards an output coupling grating, for example, the third grating 104c. The phase profile is adjusted by changing the thickness of the optical device 100.

As shown in FIGS. 3A-3D, the optical device 100 includes a plurality of optical device structures 102 formed on a substrate 101. The method 200 is applied to optical device structures 102 with a pitch uniformity and angle uniformity that is well-controlled (e.g., high uniformity). The pitch (see FIG. 5A) of the optical device structures 102 is defined as the distance between leading edges or trailing edges of adjacent optical device structures 102. The optical device structures 102 are well-controlled if the ratio of standard deviation of the pitch to the pitch nominal value is less than about $10^{-4}$.

The substrate 101 includes a bottom surface 105 and a top surface 103. Regions of the optical device structures 102 correspond to one or more gratings 104, such as a first grating 104a, a second grating 104b, and a third grating 104c. Prior to the method 200, the optical device 100 is inspected. For example, a metrology process inspects the optical device 100 to determine if the optical device 100 meets a pre-determined threshold for display efficiency and display uniformity.

Figures 3A, 3B:
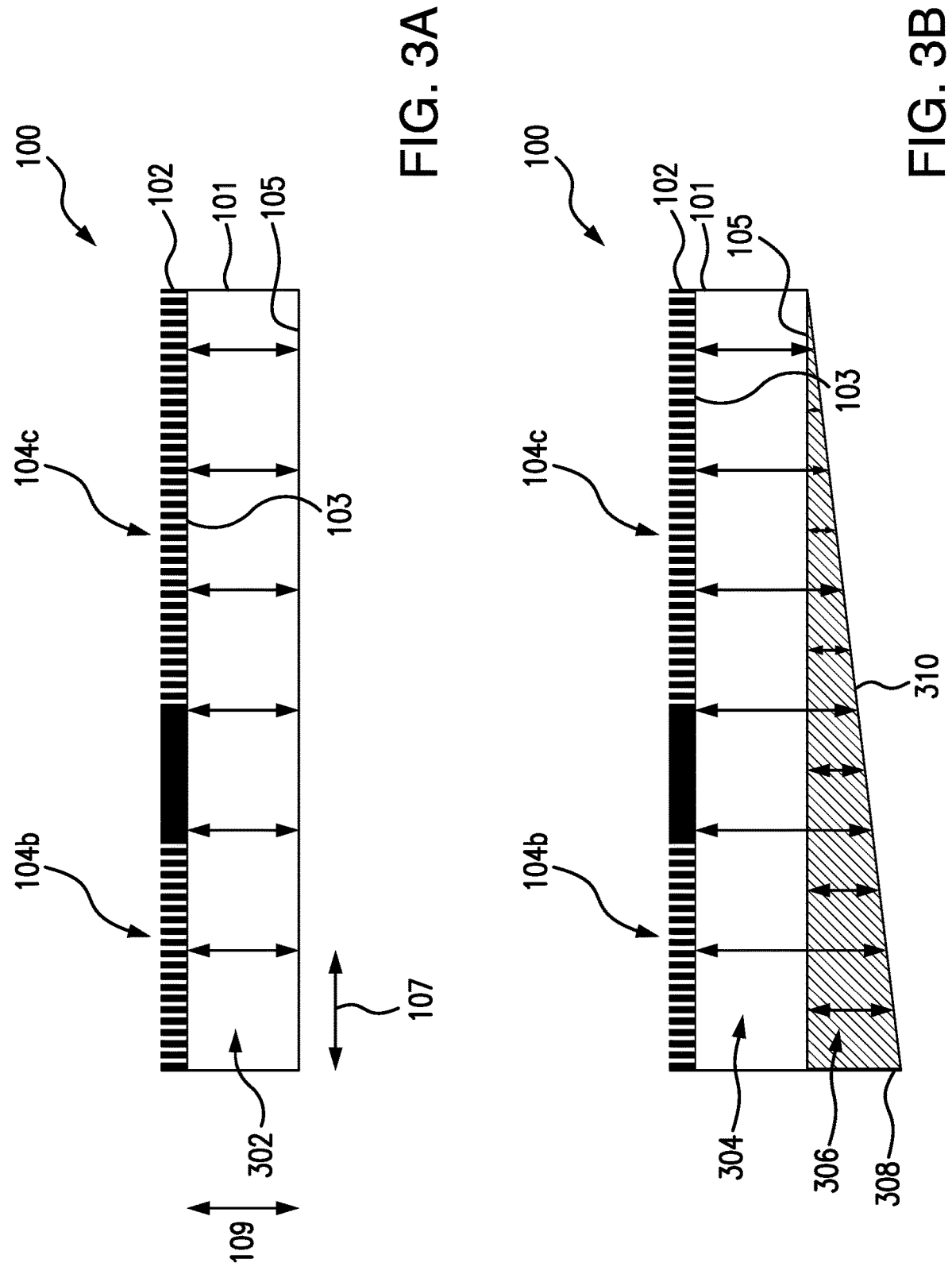

At operation 201, as shown in FIG. 3A, a substrate thickness distribution 302 of the substrate 101 is measured. The substrate thickness distribution 302 is measured with a laser interferometer. The substrate thickness distribution 302 is defined by the distance between the top surface 103 of the substrate and the bottom surface 105 along a first length 107 of the substrate 101. The first length 107 is parallel to the top surface 103 of the substrate 101. The substrate thickness distribution 302 can also vary along a second length 109 perpendicular to the first length 107. The substrate thickness distribution 302 is collected as data and sent to a controller or computer.

At operation 202, a design thickness distribution 304 is determined. The design thickness distribution 304 is the target thickness distribution that is to be formed from the substrate thickness distribution 302. The design thickness distribution 304 can vary across the first length 107 of the substrate in a linear or nonlinear distribution. The design thickness distribution 304 can also vary along a direction perpendicular to the first length 107, for example, the design thickness distribution 304 can vary along the second length 109.

At operation 203, an engineered thickness distribution 306 is determined. The engineered thickness distribution 306 is determined by subtracting the design thickness distribution 304 at each position along the first length 107 from the substrate thickness distribution 302 at each position along the first length 107. The engineered thickness distribution can also be determined to vary along a direction perpendicular to the first length 107, for example, the design thickness distribution 304 can vary along the second length 109. The engineered thickness distribution 306 is calculated with physical optics and ray tracing optics models, with the full optical device 100 design information, for example, critical dimensions of the optical device structures 102, height, pitch, and angle of the optical device structures 102, optical material properties of the optical device 100.

At operation 204, as shown in FIG. 3B, an index-matched layer 308 with the engineered thickness distribution 306 is disposed to form the design thickness distribution 304. The design thickness distribution 304 is different than the substrate thickness distribution 302. The index-matched layer 308 is disposed over the bottom surface 105 of the substrate 101. The index-matched layer 308 has a first refractive index that matches or substantially matches a second refractive index of the substrate 101. For example, the first refractive index and the second refractive index are within about 5% of each other. The refractive index of the substrate 101 and the index-matched layer 308 is between about 1.7 and about 2.9. The difference between the refractive index of the substrate 101 and the index-matched layer 308 is between about and about 0.1.

The substrate 101 and the index-matched layer 308 may be formed from any suitable material, provided that the substrate 101 can adequately transmit light in a targeted wavelength or wavelength range and can serve as an adequate support for the optical devices 100. The substrate 101 may be a material including, but not limited to, amorphous dielectrics, non-amorphous dielectrics, crystalline dielectrics, silicon oxide, polymers, and combinations thereof. In some embodiments, which may be combined with other embodiments described herein, the substrate 101 includes a transparent material. In one example, the substrate 101 includes one or more of high index glass, silicon dioxide ($SiO_2$), fused silica, quartz, silicon carbide (SiC), $LiNbO_3$, diamond (C), gallium nitride (GaN), sapphire, or combinations thereof. The index-matched layer 308 is a deposited thin film containing silicon nitride (SiN), titanium oxide (TiOx), tantalum oxide (TaOx), niobium oxide (NbOx), zirconium oxide (ZrOx), or a synthesized nanoparticle material. For example, the index-matched layer 308 is titanium oxide ($TiO_2$) or zirconium oxide ($ZrO_2$) material with nanoparticles embedded in a polymer matrix. In one example, the substrate 101 and the index-matched layer 308 are different materials. In another example, the substrate 101 and the index-matched layer 308 are the same material.

The substrate 101 and the index-matched layer 308 combine to form the design thickness distribution 304. The design thickness distribution 304 is defined by the distance between the top surface 103 of the substrate 101 an exterior surface 310 of the index-matched layer 308 along the first length 107 and the second length 109 perpendicular to the first length 107. The exterior surface 310 is facing away from the substrate 101. The design thickness distribution 304 and the engineered thickness distribution 306 are not limited by FIGS. 3A-3D and may be distributed as determined to improve optical device performance.

In a first embodiment, which can be combined with other embodiments described herein, the index-matched layer 308 is disposed over the bottom surface 105 of the substrate 101. The index-matched layer 308 is selectively etched to form the engineered thickness distribution 306. The selective etch includes at least one of ion implantation, ion beam etching (IBE), reactive ion etching (RIE), directional RIE, plasma etching, and thermal atomic layer etching. The engineered thickness distribution 306 in combination with the substrate thickness distribution 302 forms the design thickness distribution 304. In a second embodiment, which can be combined with other embodiments described herein, the index-matched layer 308 is selectively deposited. For example, the index-matched layer 308 is selectively deposited with an inkjet printing process to form the engineered thickness distribution 306. The engineered thickness distribution 306 in combination with the substrate thickness distribution 302 forms the design thickness distribution 304.

At optional operation 205, as shown in FIG. 3C, an anti-reflective layer 312 is disposed over the exterior surface 310 of the index-matched layer 308. The anti-reflective layer 312 is conformal to the index-matched layer 308. In one embodiment, the anti-reflective layer 312 includes multiple stacked layers of material. For example, the layer of the anti-reflective material include one or more of SiOx, ZrOx and TiOx. The anti-reflective layer 312 may include an alternating low index layer and high index layer. The low index layer has a refractive index of between about 1.4 and about 1.7. The high index layer has a refractive index greater than about 2. The low index layer is a SiOx material. The high index layer is a metal oxide material. The anti-reflective layer 312 is configured to increase the efficiency of the optical device by reducing light lost due to reflection. The anti-reflective layer 312 is disposed via an ALD process.

At optional operation 206, as shown in FIG. 3D, a low index layer 314 is disposed over the plurality of optical device structures 102. The low index layer 314 is a SiOx material. The low index layer is utilized for improving anti-reflective properties. The low index layer 314 has a refractive index of about 1.4 to about 1.7.

By forming the design thickness distribution 304, the phase change of the optical device 100 is adjusted to modulate the optical interference between different light paths. Forming the design thickness distribution 304 will enhance light coupling efficiency to the output coupling grating, for example, the third grating 104c, and optimize efficiency across the optical device 100. The method 200 can be utilized to allow already manufactured optical devices 100 that do not predetermined efficiency thresholds to meet the predetermined efficiency thresholds.

FIG. 4 is a flow diagram of a method 400 of modifying the thickness of an optical device 100. FIGS. 5A-5D are schematic, side views of an optical device 100 during the method 400. The method 400 improves the display efficiency and display uniformity of the optical device 100, while not damaging and/or reducing the display resolution. The method 400 also will save optical devices 100 with low efficiency or display uniformity below a pre-determined threshold. The optical device 100 is already formed but may have a lower efficiency due to thickness of the optical device or pitch uniformity of the optical device structures. Adjusting the thickness variation will allow light to go in the correct optical path towards an output coupling grating, for example, the third grating 104*c*. The phase profile is adjusted by changing the thickness of the optical device 100.

Figures 5A, 5B:
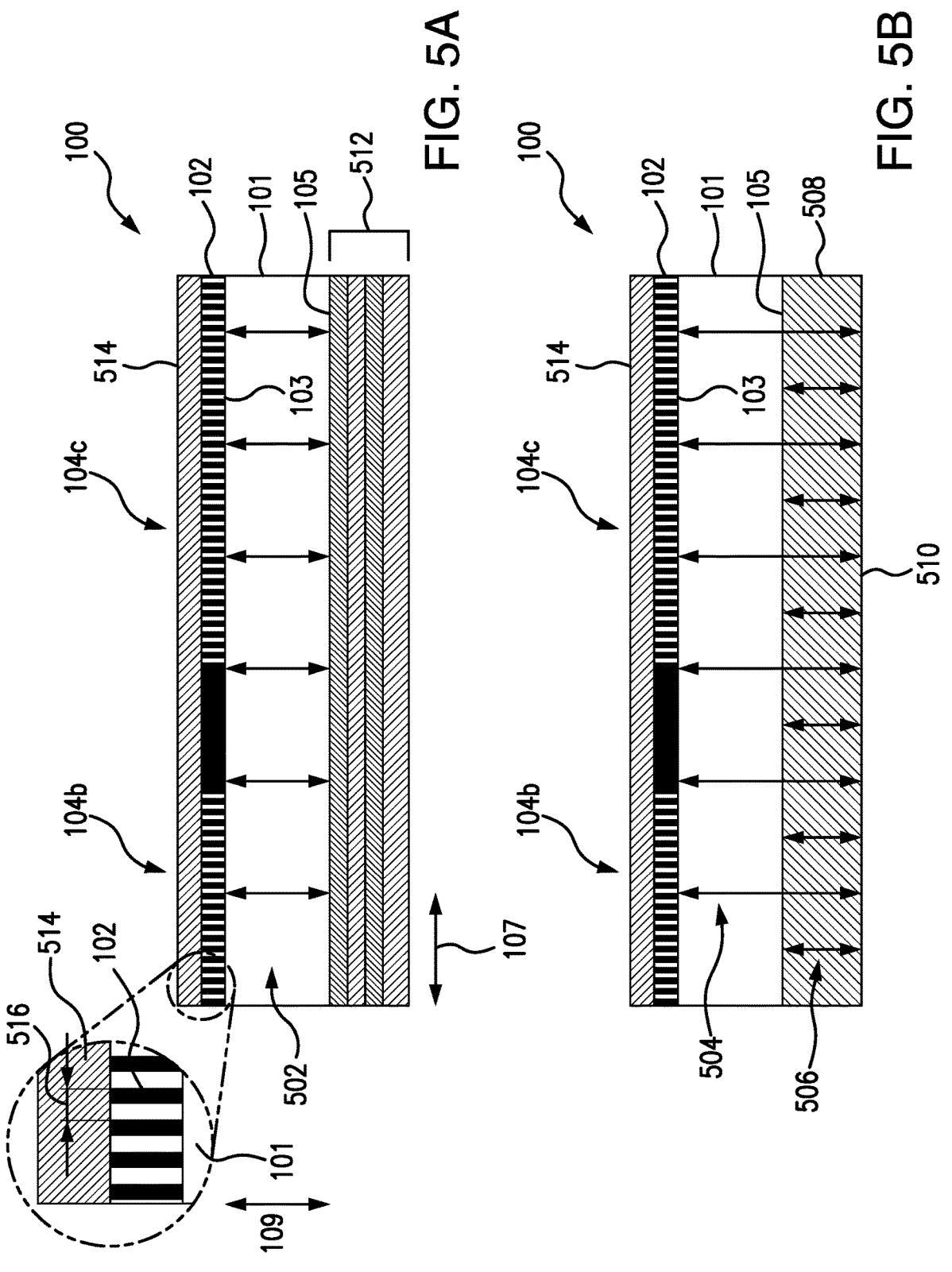
FIGS. 5A-5D are schematic, side views of an optical device during the method according to embodiments described herein.

As shown in FIG. 5A, the optical device 100 includes a plurality of optical device structures 102 formed on a substrate 101. The method 400 is applied to optical device structures 102 with a pitch uniformity and angle uniformity that is not controlled (e.g., low uniformity). The optical device structures 102 are considered to be well-controlled if the ratio of standard deviation of the pitch 516 to the pitch 516 nominal value is greater than about $10^{-4}$.

The substrate 101 includes a bottom surface 105 and a top surface 103. Regions of the optical device structures 102 correspond to one or more gratings 104, such as a first grating 104*a*, a second grating 104*b*, and a third grating 104*c*. An anti-reflective layer 512 is disposed over the bottom surface 105 of the substrate 101. A low index layer 514 is disposed over the plurality of optical device structures 102.

Prior to the method 400, the optical device 100 is inspected. For example, a metrology process inspects the optical device 100 to determine if the optical device 100 meets a pre-determined threshold for display efficiency and display uniformity. If the optical device 100 does not meet the pre-determined threshold, the method 400 may be performed. The method 400 may be performed to restore the optical device 100 to meet the pre-determined threshold.

At operation 401, as shown in FIG. 5A, a substrate thickness distribution 502 of the substrate 101 is measured and a phase map is generated. The substrate thickness distribution 502 is measured with a laser interferometer. The substrate thickness distribution 502 is defined by the distance between the top surface 103 of the substrate 101 and the bottom surface 105 along a first length 107 of the substrate 101 and perpendicular to the first length 107, for example, along a second length 109 perpendicular to the first length 107. The substrate thickness distribution 502 is collected as data and sent to a controller or computer. Based on the substrate thickness distribution 502, a phase map is generated. The phase map specifies the phase at each location on the substrate 101 across the bottom surface 105 of the substrate 101. The phase map is generated by determining the phase change at each location. The phase change is determined by obtaining the thickness variation at each location and dividing by wavelength of light to transmit times 2 pi.

At operation 402, a design thickness distribution 504 is determined and a design phase map is generated. The design thickness distribution 504 is the target thickness distribution that is to be formed from the substrate thickness distribution 502. The design thickness distribution 504 can vary across the first length 107 and along the second length 109 perpendicular to the first length 107 of the substrate 101 in a linear or nonlinear distribution. The design phase map is generated from the design thickness distribution 504. The design phase map specifies the phase that will be formed at each location on the substrate 101 in the final optical device 100. The design phase map is generated by a waveguide design software application.

At operation 403, non-uniformity of pitch 516 of the plurality of optical device structures 102 is measured. The pitch 516 is defined as the distance between leading edges or trailing edges of adjacent optical device structures 102. The pitch 516 of each of the adjacent optical device structures 102 is measured to determine the degree of non-uniformity of the pitch 516 across the substrate 101. The pitch 516 at each location across the substrate 101 is mapped out. The uniformity of the optical device structures 102 is defined by the ratio of standard deviation of the pitch 516 to the nominal value of the pitch 516.

At operation 404, an engineered phase profile is generated. The engineered phase profile is the change to the phase of the phase map to form the design phase map. The engineered phase profile is generated by subtracting the phase map and the pitch 516 non-uniformity from the design phase map at each location across the optical device 100. The engineered phase profile can be generated with an engineered phase at each location along the first length 107 and a direction perpendicular to the first length 107, for example, along the second length 109.

At operation 405, the engineered phase profile is converted to an engineered thickness distribution 506. The engineered phase profile is converted to the engineered thickness distribution 506 by dividing the phase change at each location by wavelength of light to transmit times 2 pi.

The engineered thickness distribution 506 is determined by subtracting the design thickness distribution 504 at each position along the first length 107 from the substrate thickness distribution 502 at each position along the first length 107 and perpendicular to the first length 107, for example, along the second length 109. The engineered thickness distribution 506 is calculated with physical optics and ray tracing optics models, with the full optical device 100 design information (e.g., critical dimensions of the optical device structures 102, height, pitch, and angle of the optical device structures 102, optical material properties of the optical device 100).

Figures 5C, 5D:
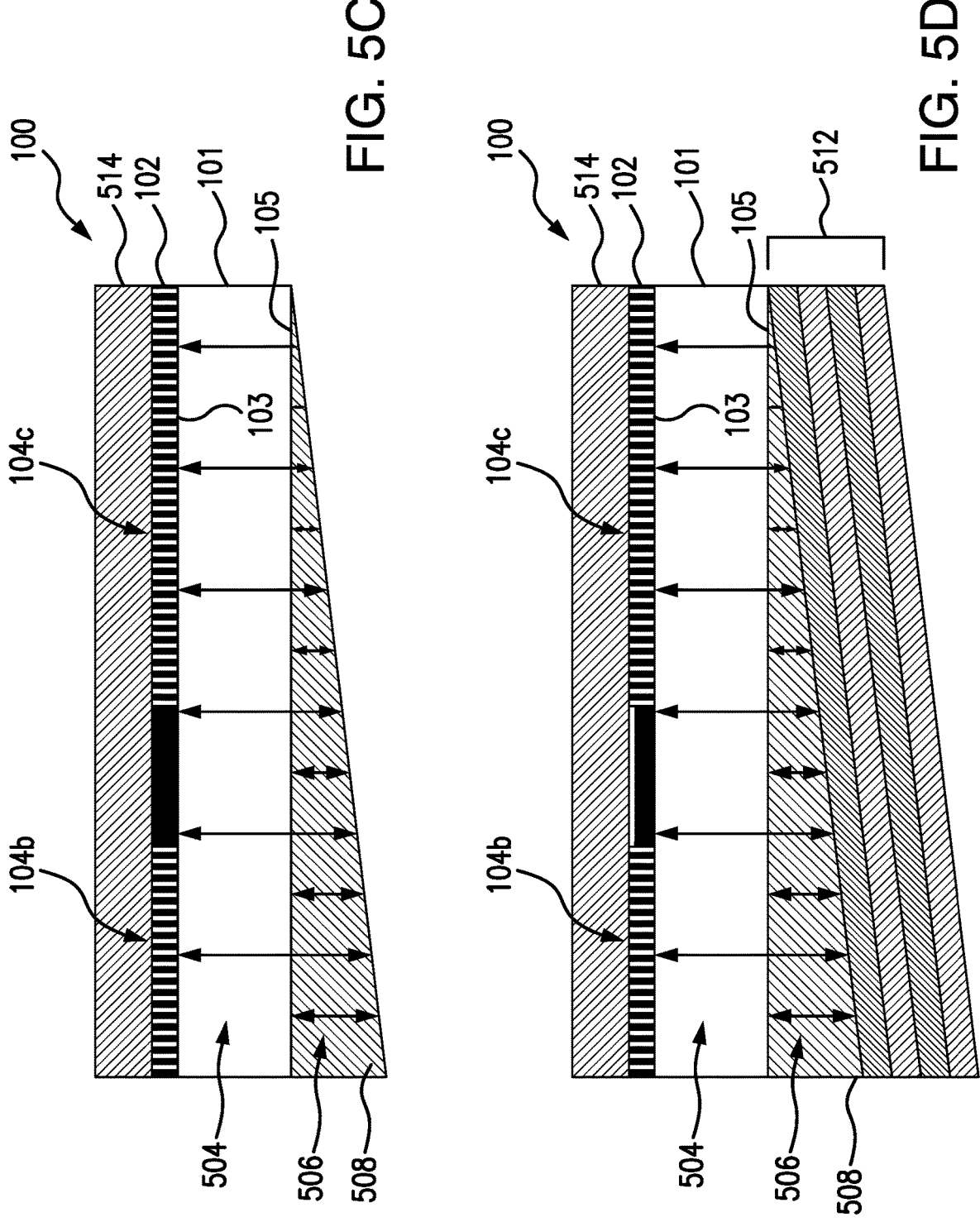

At operation 406, as shown in FIG. 5B, the anti-reflective layer 512 is removed. The anti-reflective layer 512 is removed via an etch process. At operation 407, as shown in FIGS. 5B and 5C, an index-matched layer 508 is disposed. The index-matched layer 508 is disposed over the bottom surface 105 of the substrate 101. The index-matched layer 508 has a first refractive index that matches or substantially matches a second refractive index of the substrate 101.

In a first embodiment shown in FIG. 5B and FIG. 5C, which can be combined with other embodiments described herein, the index-matched layer 508 is disposed over the bottom surface 105 of the substrate 101 (see FIG. 5B). The index-matched layer 508 is selectively etched to form the engineered thickness distribution 506. The selective etch includes at least one of ion implantation, ion beam etching (IBE), reactive ion etching (RIE), directional RIE, plasma etching, and thermal atomic layer etching. The engineered thickness distribution 506 in combination with the substrate thickness distribution 502 forms the design thickness distribution 504.

In a second embodiment shown in FIG. 5C, which can be combined with other embodiments described herein, the index-matched layer 508 is selectively deposited. For example, the index-matched layer 508 is selectively deposited with an inkjet printing process to form the engineered thickness distribution 506. In other words, the index-matched layer 508 is deposited to have the engineered thickness distribution 506 without an etching process. As such, the operation shown in FIG. 5B is optional. The engineered thickness distribution 506 in combination with the substrate thickness distribution 502 forms the design thickness distribution 504.

The substrate 101 and the index-matched layer 508 combine to form the design thickness distribution 504. The design thickness distribution 504 is defined by the distance between the top surface 103 of the substrate 101 and an exterior surface 510 of the index-matched layer 508 along the first length 107 and perpendicular to the first length 107, for example, along the second length 109. The design thickness distribution 504 is different than the substrate thickness distribution 502. The exterior surface 510 is facing away from the substrate 101. The design thickness distribution 504 and the engineered thickness distribution 506 are not limited by FIGS. 5A-5D and may be distributed as determined to improve optical device performance.

At optional operation 408, as shown in FIG. 5D, the anti-reflective layer 512 is disposed over the exterior surface 510 of the index-matched layer 508. The anti-reflective layer 512 is conformal to the index-matched layer 508. In one embodiment, the anti-reflective layer 512 includes multiple stacked layers of material. The anti-reflective material may include an alternating low index layer and high index layer. The anti-reflective layer 512 is configured to increase the efficiency of the optical device by reducing light lost due to reflection. The anti-reflective layer 512 is disposed via an ALD process.

By forming the design thickness distribution 504, the phase change of the optical device 100 is adjusted to modulate the optical interference between different light paths. Forming the design thickness distribution 504 will enhance light coupling efficiency to the output coupling grating, for example, the third grating 104c, and optimize efficiency across the optical device 100. The method 400 can be utilized to allow already manufactured optical devices 100 that do not meet predetermined efficiency thresholds to meet the predetermined efficiency thresholds.

In summation, methods of modifying and engineering the effective thickness of an optical device substrate are provided. The methods provide for depositing a material that is index-matched to the substrate to alter a thickness distribution of the optical device. By adjusting the thickness distribution, the optical path of light is modulated to direct the light to the output coupling grating. The methods improve the display efficiency and uniformity without damaging the display resolution. The methods also are used to alter optical devices that do not meet pre-determined efficiency thresholds such that the optical devices will meet the pre-determined thresholds.

While the foregoing is directed to embodiments of the present disclosure, other and further embodiments of the disclosure may be devised without departing from the basic scope thereof, and the scope thereof is determined by the claims that follow.

What is claimed is:

1. A method of forming a design thickness distribution in an optical device, comprising:

measuring a substrate thickness distribution of a substrate defined by a distance between a top surface of the substrate and a bottom surface of the substrate along a first length parallel to the top surface and a second length perpendicular to the first length;

generating a phase map from the substrate thickness distribution across the bottom surface of the substrate;

measuring a non-uniformity of pitch between adjacent optical device structures of a plurality of optical device structures disposed on the top surface of the substrate;

generating an engineered phase profile by subtracting the phase map and the non-uniformity of pitch from a design phase map corresponding to a phase to be formed at each location of the optical device;

converting the engineered phase profile to an engineered thickness distribution; and disposing an index-matched layer on the bottom surface of the substrate to have the engineered thickness distribution to form a design thickness distribution, wherein the design thickness distribution is defined by the engineered thickness distribution and the substrate thickness distribution, wherein the design thickness distribution varies along the first length and the second length.

2. The method of claim 1, wherein the index-matched layer is disposed via an inkjet printing process to have the engineered thickness distribution.

3. The method of claim 1, wherein the substrate has a first refractive index and the index-matched layer has a second refractive index, wherein the second refractive index substantially matches the first refractive index.

4. The method of claim 1, further comprising removing an anti-reflective layer from the bottom surface of the substrate before disposing the index-matched layer.

5. The method of claim 4, further comprising disposing the anti-reflective layer over an exterior surface of the index-matched layer via an ALD process.

6. The method of claim 4, wherein the anti-reflective layer includes two or multiple stacked layers of material.

7. The method of claim 4, wherein the anti-reflective layer includes an alternating low index layer and high index layer, wherein the low index layer has a refractive index of between about 1.4 and about 1.7 and the high index layer has a refractive index of greater than about 2.0.

* * * * *